E. MILLER.
GARDEN TRUCK WEEDING MACHINE.
APPLICATION FILED NOV. 13, 1917.
1,287,391.
Patented Dec. 10, 1918.
2 SHEETS—SHEET 1.
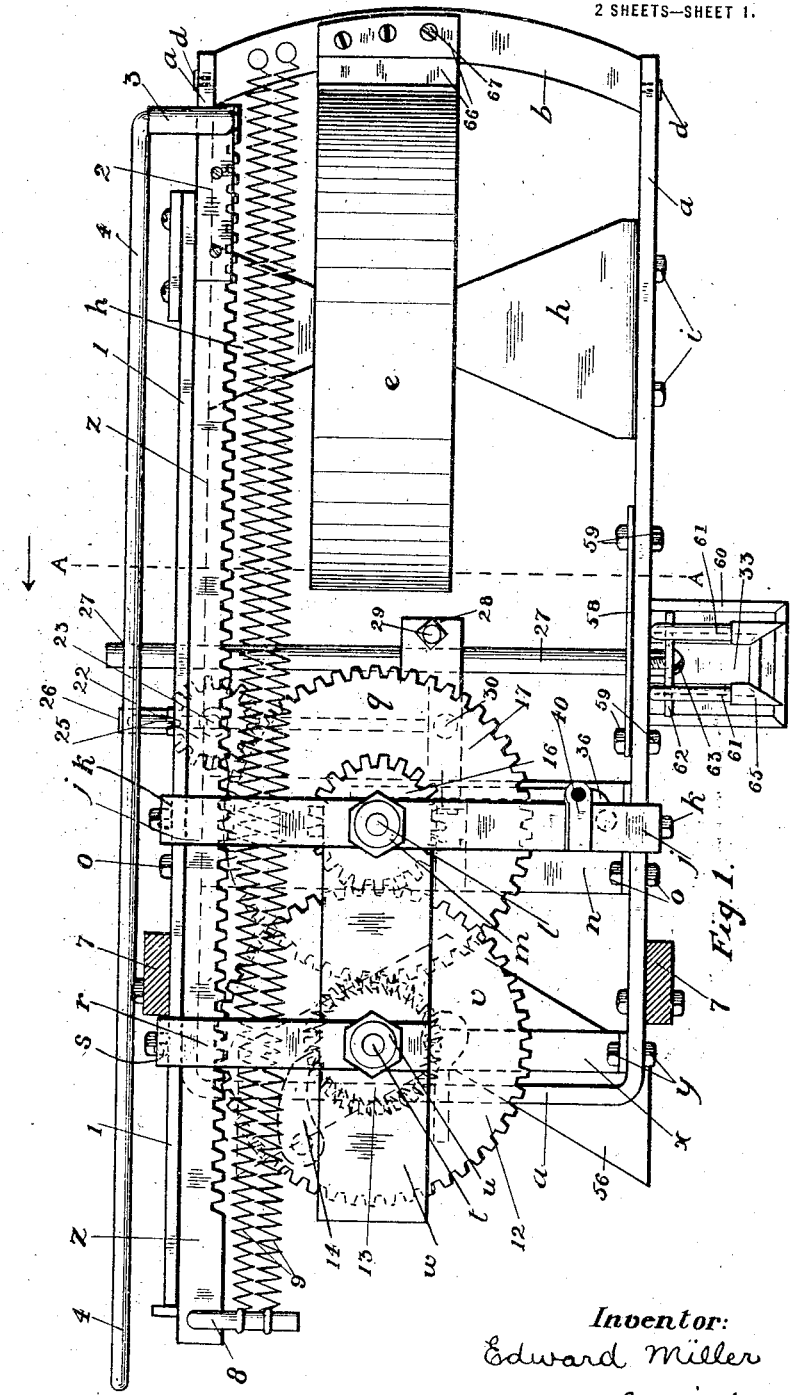
Inventor:
Edward Miller
by T. J. Geisler
Atty.

E. MILLER.
GARDEN TRUCK WEEDING MACHINE.
APPLICATION FILED NOV. 13, 1917.
1,287,391.
Patented Dec. 10, 1918.
2 SHEETS—SHEET 2.
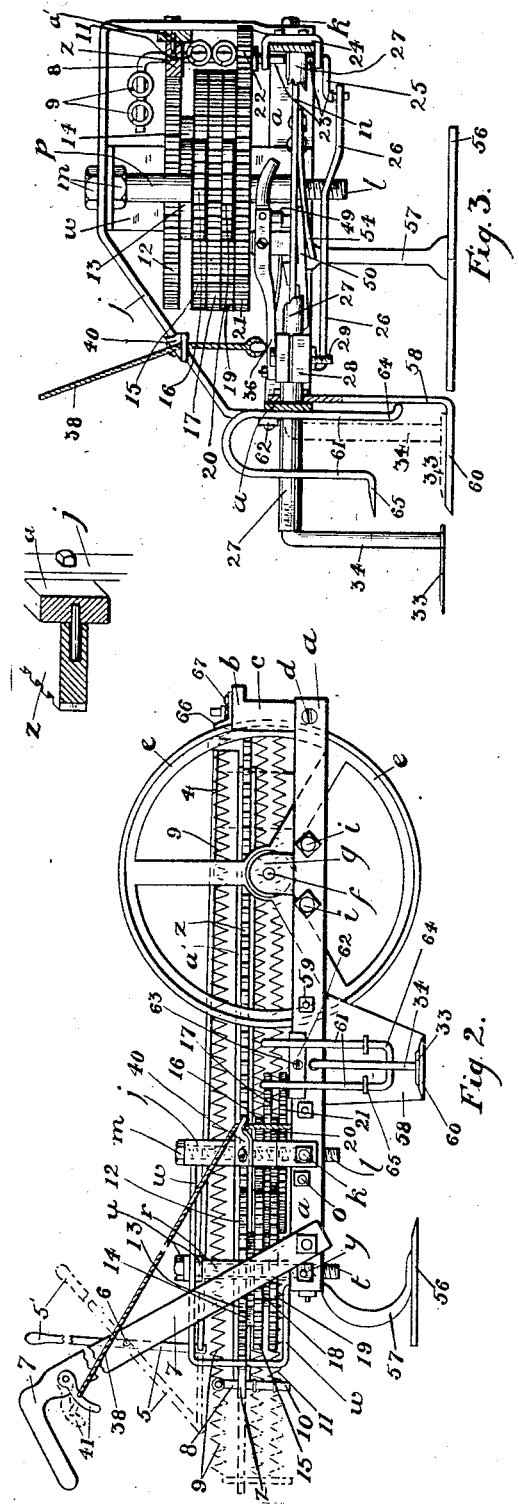
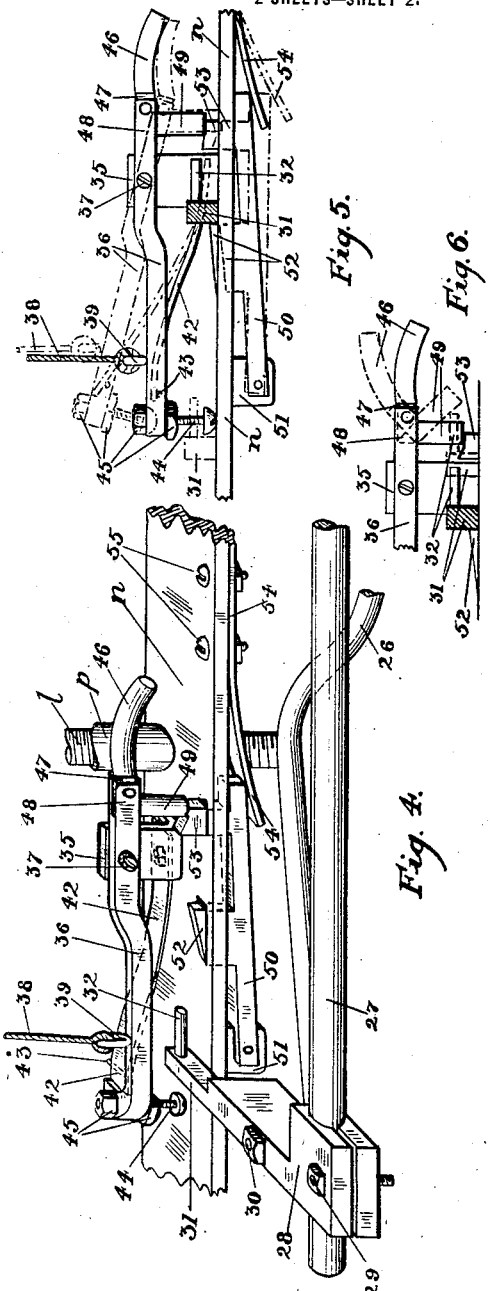
Inventor:
Edward Miller
by T. J. Geisler
Atty.

UNITED STATES PATENT OFFICE.

EDWARD MILLER, OF PORTLAND, OREGON.

GARDEN-TRUCK-WEEDING MACHINE.

1,287,391.   Specification of Letters Patent.   Patented Dec. 10, 1918.

Application filed November 13, 1917. Serial No. 205,462.

*To all whom it may concern:*

Be it known that I, EDWARD MILLER, a citizen of the United States, and a resident of the city of Portland, county of Multnomah, State of Oregon, have invented a certain new and useful Improvement in Garden-Truck-Weeding Machines, of which the following is a specification.

One of the main objects of my invention is to provide a simple and efficient machine for destroying the weeds in the rows of an onion bed and for like purposes.

I attain my object in a wheel-mounted body adapted for being run between and along cultivated rows, and comprising a knife movable in a horizontal plane, power-actuated devices for imparting a cutting action to the knife, and means placed within convenient reach of the operator for throwing said knife-actuating means into action, as desired.

My machine operates to cut the weeds underground. Its construction is as shown in the accompanying drawings, in which:

Figure 1 is a partial top view of my machine with the handles omitted;

Fig. 2 is a side elevation of my machine;

Fig. 3 is a transverse section on line A—A of Fig. 1, looking in the direction pointed by the arrow; in this view the knife is shown in projected position;

Fig. 4 is a larger-scale, perspective detail, taken crosswise of the machine, looking rearward, and shows those parts which carry the knife; and Figs. 5 and 6 are details of the actions of certain parts of my machine.

My invention consists of a U-shaped frame $a$, united at the front by the curved member $b$, the bent ends $c$ of which are secured to the frame by screws $d$. The ground wheel $e$ turns on the axle $f$, journaled in the portions $g$ of the frame members $h$ (see Figs. 1 and 2) fastened to the frame, $a$, by bolts $i$. A transverse frame member $j$, bent as shown in Fig. 3, is fastened to the sides of the frame, $a$, by bolts $k$, and supports a pendent post $l$, secured by nuts $m$. The lower support for the post $l$ is threaded into a cross-bar $n$ fastened at its ends to the frame, $a$, by bolts $o$. A sleeve $p$ is mounted on the post $l$, between the frame members $j$ and $n$. The forward set of gears $q$ (see Fig. 1) are rotatably mounted on the post $l$.

A cross-bar $x$, fastened to the sides of the frame by nuts $y$, forms the lower support for a post $t$, the upper end of which is fastened by nuts $u$ to an angular cross-bar $r$, extending half way across the frame $a$. On the post $t$ is mounted a sleeve similar to $p$, and thereon are rotatably mounted the rear set of gear wheels $v$. An angular, longitudinal frame member $w$ is fastened to the frame, $a$, at the back, spanning the rear gear wheels $v$, and constitutes a brace for the bars $n$, $r$.

A rack-bar $z$ is slidably supported along the far side of the frame. A bar $a'$ is secured to the frame and serves as a means for holding the rack bar $z$ in position while being reciprocated. A bracket 2 is fastened to the rack bar $z$ and supports the bent arm 3, to which is pivotally connected a rod 4, the other end of which is attached to a lever 5 fulcrumed on a cross rod 6, fastened between the handles 7. A bent post 8, on the rear end of the rack bar $z$, supports the rear ends of the two upper springs 9, the front ends of which are fastened to the frame member $b$. The lower end 10 of the bent post 8 holds the rear ends of the lower two springs 11, the other ends of which are fastened to the member $c$ of the frame member $b$. When the handle end 5' of the lever 5 is pushed forward the lower end of this lever pulls the rod 4, and therewith the rack bar $z$, back. The springs 9 and 11 are thus placed in tension.

The gear wheel 12 of the rear set of gears $v$ meshes with the rack bar $z$. The gear 15 has a ratchet wheel 13 with which a pawl 14, carried by the gear 12, engages; and hence when the gear 12 is rotated to the right by the rack bar $z$ it will rotate the gear 15 also.

The power of the springs is employed to rotate the crank axle 23, on which is a pinion 22, driven by the gear 15 through the train of gears 16, 17, 18, 19, 20, 21.

A transverse bar 27 is reciprocably supported by the sides of the frame $a$ and carries the knife 33. The knife 33 has its shank 34 removably threaded into the rod 27 (see Fig. 4) so as to permit the use of knives of different sizes and shapes. The knife-bar 27 is connected to the crank arm 25 of the crank axle 23 by a rod 26. See Fig. 3. The knife-bar 27 has a rigid arm 28 fastened by bolt 29, and to this arm the rod 26 is pivotally connected by bolt 30.

A lever 50 is pivoted to a lug 51 on the under side of the cross bar $n$. This lever 50 has projections 52, 53 passing through openings in the cross bar n. The lever 50 is held in lifted position by a spring 54 secured to bar n by bolts 55.

When the machine has been set for action, the projection 31 of the arm 28 is located between the projections 52 and 53 of the lever 50 and bears against the projection 52. The knife 33 then is in its retracted position.

The knife-bar 27 is released and again arrested by the following mechanism: The arm 28 has a projecting piece 31 carrying a pin 32. The cross-bar n has a vertical support 35 (Fig. 4) to which is pivoted, by bolt 37, a lever 36. A cord 38, which is fastened to said lever 36 at the screw-eye 39, is passed through the guide piece 40 on the frame member j to the trigger 41 on the handle 7. A foot 44 is fastened to the lever 36 by nuts 45 and rests on the bar n. A spring 42 is fastened at one end to the bar n and bears on a pin 43 of the lever 36 and holds the latter down. A bell crank 46 is pivoted at 47 in the forked end 48 of the lever 36.

The upper faces of said projections 52, 53 of the lever 50 are inclined, as shown, but the projection 53 has also a flat surface on which rests the pendent arm 49 of the bell-crank 46.

The action of my machine is as follows:

Assuming the coil springs 9, 11 to have been placed in tension, when the trigger 41 is then pulled the cord 38 lifts the lever 36 and causes the bell-crank 46 to force the lever 50 down, in so doing releasing the arm 28. The coil springs will then pull the rack bar z forward, and through the train of gears will rotate the crank axle 25 at great speed, thereby causing the knife to be projected and retracted rapidly with sufficient force to cut off the weeds. When the knife-bar 27 makes its cutting movement the pin 32 of the arm 28 pushes the pendent member 49 of the bell crank 46 off the projection 53 of the lever 50, so that the latter may be restored to its normal position by the action of the spring 54. Compare Figs. 4, 5, and 6. Thus no matter if the lever 36 is kept in tilted position, by holding the trigger 41, the knife can only be operated but once, and the trigger must be pulled each time the knife is to be operated. But for such provision the knife bar 27 would continue to reciprocate and use up the power of the actuating springs without purpose.

A triangular shaped blade 56 is fastened to the frame, a, by the curved foot 57, and when the machine is operated this blade rides under the coil and cuts the weeds between the rows.

A foot 58 is fastened to the frame, a, by bolts 59 and has its lower part bent at right angles to provide a projecting plate 60 upon which the knife 33 is positioned when at rest. The edges of the protecting plate 60 are sharp so as to cut a passage for the knife beneath the surface of the soil.

In order to facilitate the positioning of my machine with respect to the weeds to be cut, a U-shaped pointing arm 61 is provided to locate the position of the knife 33. The extremities 65 of the knife-locating arm 61 are preferably bent outward as shown in Fig. 3.

A scraper 66 is fastened to the frame member b by screws 67, and serves to scrape the mud from the ground wheel e.

I claim:

1. A weeding machine comprising a vehicle body, a reciprocable knife-carrier having a knife adapted to cut underground, automatic means for actuating said knife-carrier, means for holding said actuating means inactive, means for releasing said actuating means, and said holding means being adapted automatically to prevent more than a single action of said actuating means for each operation of said releasing means.

2. A weeding machine comprising a vehicle body, a reciprocable knife-carrier having a knife adapted to cut underground, means for actuating said knife-carrier, and a protecting plate carried by the body and covering said knife when at rest and adapted to cut an underground passage therefor during the travel of the vehicle.

3. In a weeding machine, a vehicle body, a spring-actuated member, a reciprocable knife-carrier having a knife adapted to work underground, means for reciprocating said knife-carrier, such means operated by said spring-actuated member, means normally arresting the reciprocation of the knife-carrier, and means for withdrawing said arresting means.

4. In a weeding machine, a vehicle body, a spring-actuated member, a reciprocable knife-carrier having a knife adapted to work underground, means for reciprocating said knife-carrier, such means operated by said spring-actuated member, means normally arresting the reciprocation of the knife-carrier, means for withdrawing said arresting means, and means actuated by the reciprocation of the knife carrier for automatically restoring said arresting means to their active state after each action of the knife carrier.

5. In a weeding machine, a vehicle body, a rack bar reciprocably carried by the vehicle body, a tension spring connected with the rack bar, means for placing this spring in tension, a reciprocable knife carrier having a knife adapted to work underground, a crank axle, gearing adapted to rotate the same with the movement of the rack bar in one direction, means normally arresting the reciprocation of the knife carrier, means for withdrawing said arresting means, and means actuated by the reciprocation of the knife carrier for automatically restoring said arresting means to their active state after each action of the knife carrier.

6. In a weeding machine, a vehicle body, a rack-bar reciprocably carried by the vehicle body, a tension spring connected with the rack-bar, means for placing this spring in tension, a reciprocable knife carrier having a knife adapted to work underground, a crank axle, gearing adapted to rotate the same with the movement of the rack bar in one direction, a spring-actuated latch lever normally arresting the reciprocation of the knife carrier, means for withdrawing said latch lever, and means operated by the knife carrier releasing said latch lever after each action of the former.

7. In a weeding machine, a vehicle body, a rack bar reciprocably carried by the vehicle body, a tension spring connected with the rack bar, means for placing this spring in tension, a reciprocable knife carrier having a knife adapted to work underground, a crank-axle, gearing adapted to rotate the same with the movement of the rack-bar in one direction, a spring-actuated latch lever normally arresting the reciprocation of the knife carrier, means for withdrawing said latch lever, and means on the knife carrier releasing said latch lever after each action of the former.

EDWARD MILLER.

Copies of this patent may be obtained for five cents each, by addressing the "Commissioner of Patents, Washington, D. C."